(12) United States Patent
Wang

(10) Patent No.: US 7,502,148 B2
(45) Date of Patent: Mar. 10, 2009

(54) MULTIPLE LIGHTGUIDE ELECTRONIC DOCUMENT IMAGING DEVICE

(75) Inventor: Weng-Lyang Wang, Saratoga, CA (US)

(73) Assignee: CMOS Sensor, Inc., Cupertino, CA (US)

( * ) Notice: Subject to any disclaimer, the term of this patent is extended or adjusted under 35 U.S.C. 154(b) by 156 days.

(21) Appl. No.: 11/675,676

(22) Filed: Feb. 16, 2007

(65) Prior Publication Data
US 2008/0198427 A1    Aug. 21, 2008

(51) Int. Cl.
H04N 1/46    (2006.01)
H04N 1/04    (2006.01)

(52) U.S. Cl. ............... 358/509; 358/475; 358/483; 358/484; 358/514

(58) Field of Classification Search ......... 358/509, 358/505, 506, 512–514, 475, 483, 482, 474, 358/497, 484; 250/208.1, 234–236, 552, 250/553, 578.1; 355/67, 68
See application file for complete search history.

(56) References Cited
U.S. PATENT DOCUMENTS
6,259,082 B1 *   7/2001  Fujimoto et al. ......... 250/208.1
6,573,487 B2 *   6/2003  Matsumoto ............... 250/208.1
6,892,945 B2 *   5/2005  Shishido .................... 235/454
7,085,023 B2 *   8/2006  Okamoto et al. ........... 358/471
7,136,203 B2 *  11/2006  Yokota et al. ............... 358/484

* cited by examiner

Primary Examiner—Cheukfan Lee
(74) Attorney, Agent, or Firm—Chein-Hwa S Tsao; Chemily LLC

(57) ABSTRACT

A multi-lightguide document imaging device is proposed for scanning a document transported atop it. The device includes a line image sensor module having a top sensing area and built-in circuitry for converting an incident line image into video signal output; an intervening rod lens for focusing line image lights from the document onto the sensing area; a number or lightguides lightguide-j (j=1,2, . . . ,N) disposed below the document where each lightguide-j has its own built-in light sources, a transverse cross section spaced at a distance $SPC_j$ from the scan line an oriented angularly along a θ-coordinate so as to project a line-illumination aiming at the scan line; and an imager frame having a base for holding the line image sensor module, a multi-element support for holding the rod lens plus the lightguides and a scan line backing portion for backing the document.

10 Claims, 5 Drawing Sheets

Fig1B PRESENT INVENTION

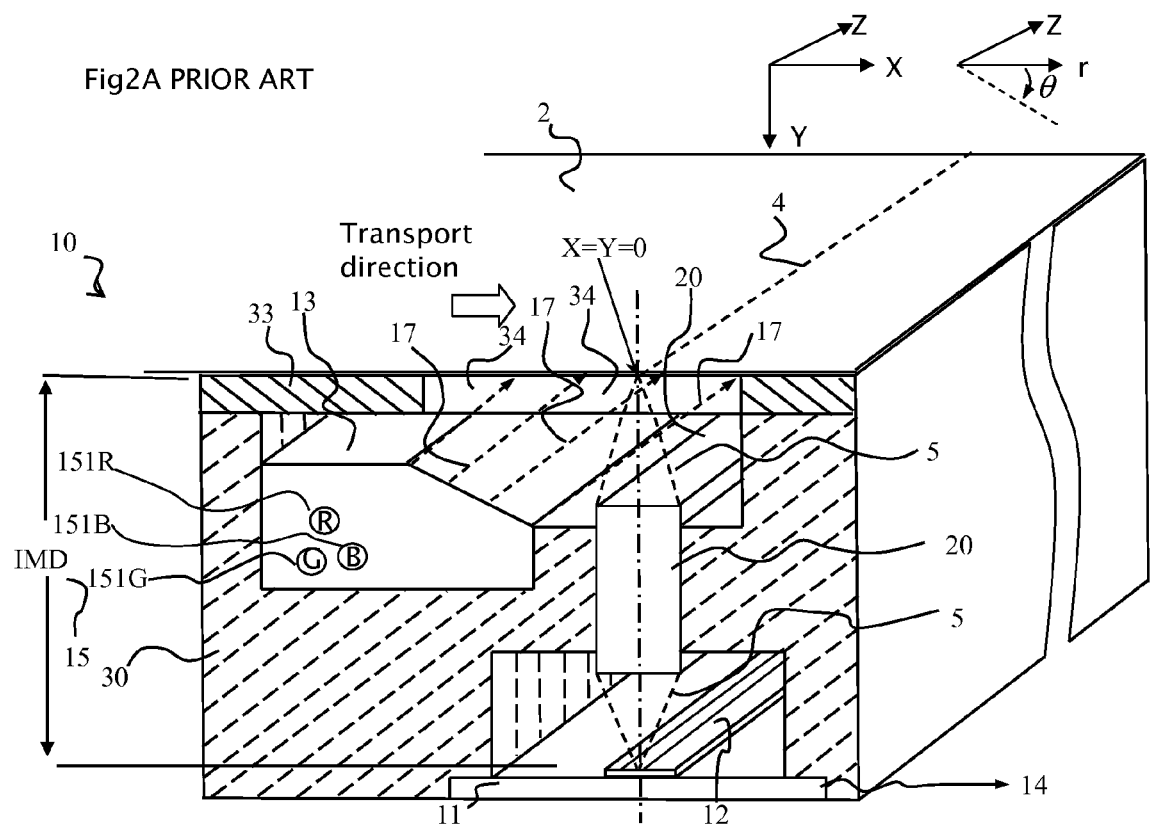
Fig2A PRIOR ART
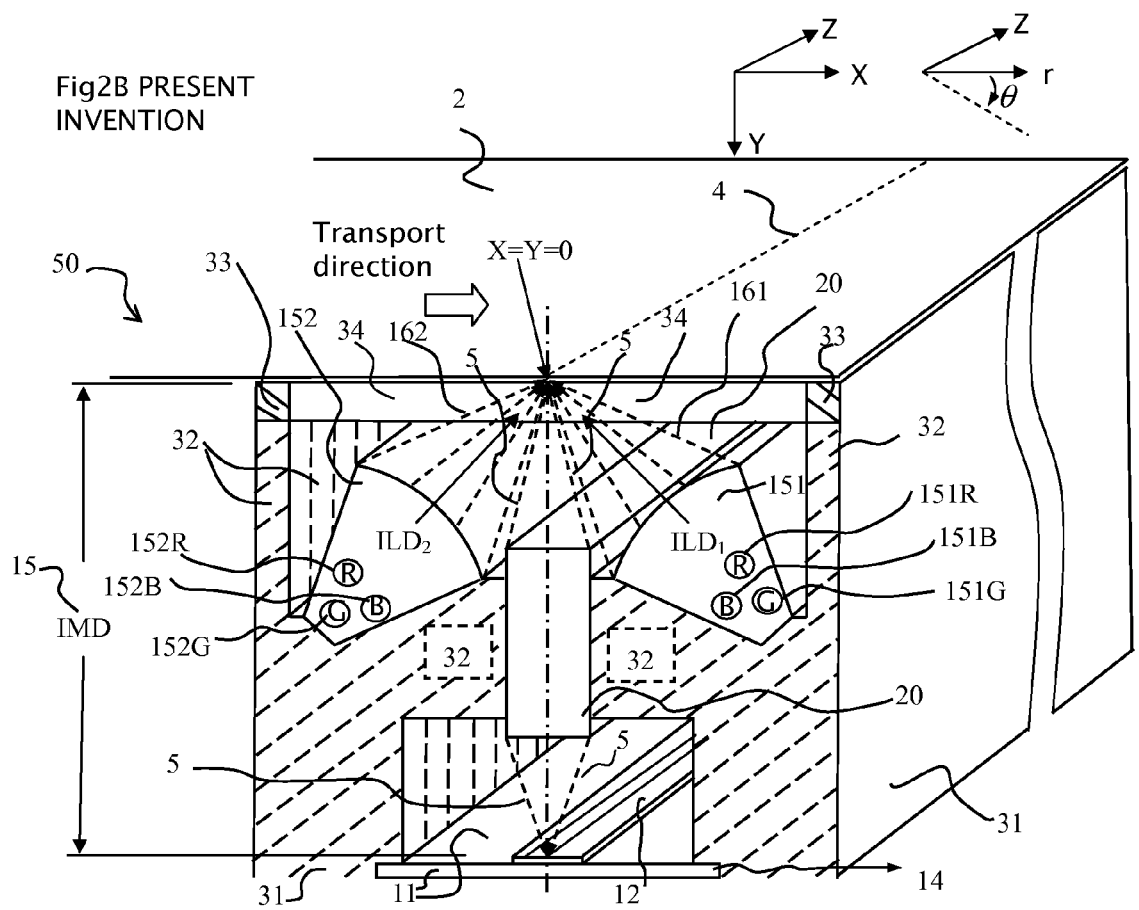
Fig2B PRESENT INVENTION $\theta_0 : 45 +/- 25°$        $\theta_0 : 135 +/- 25°$

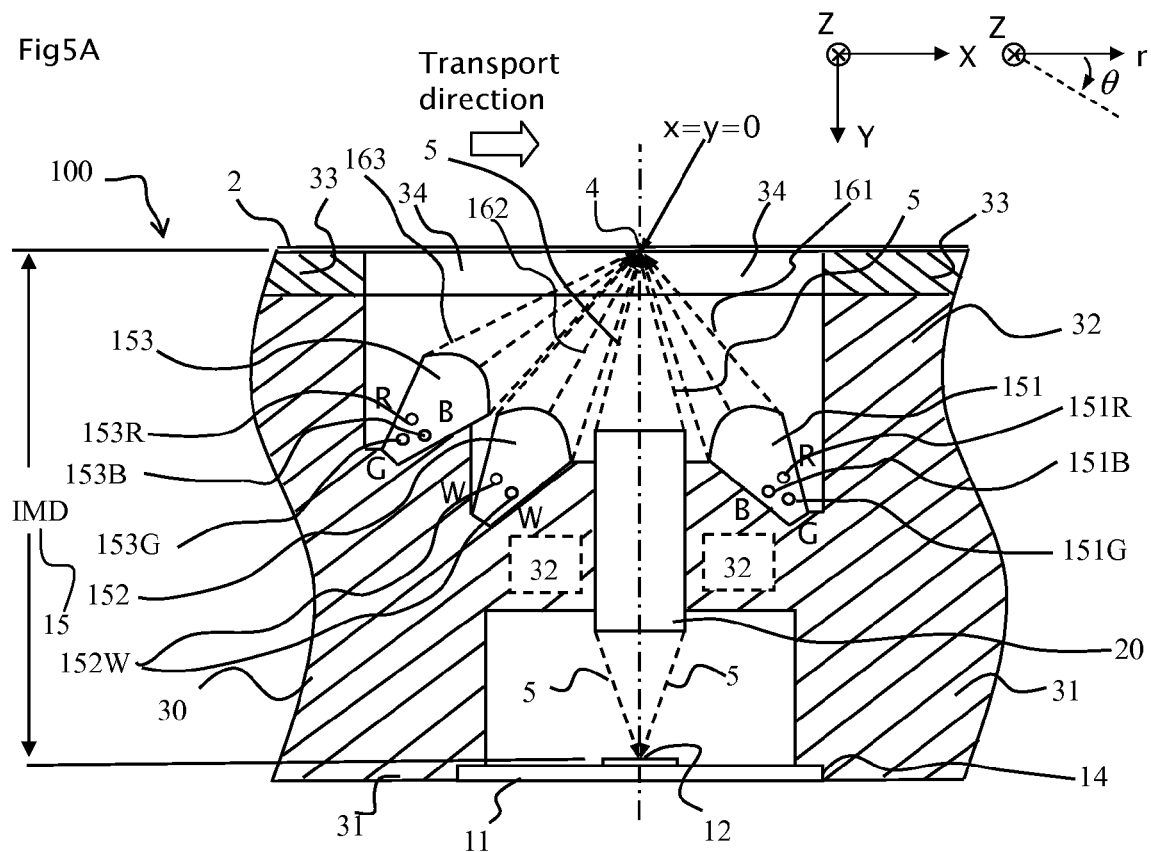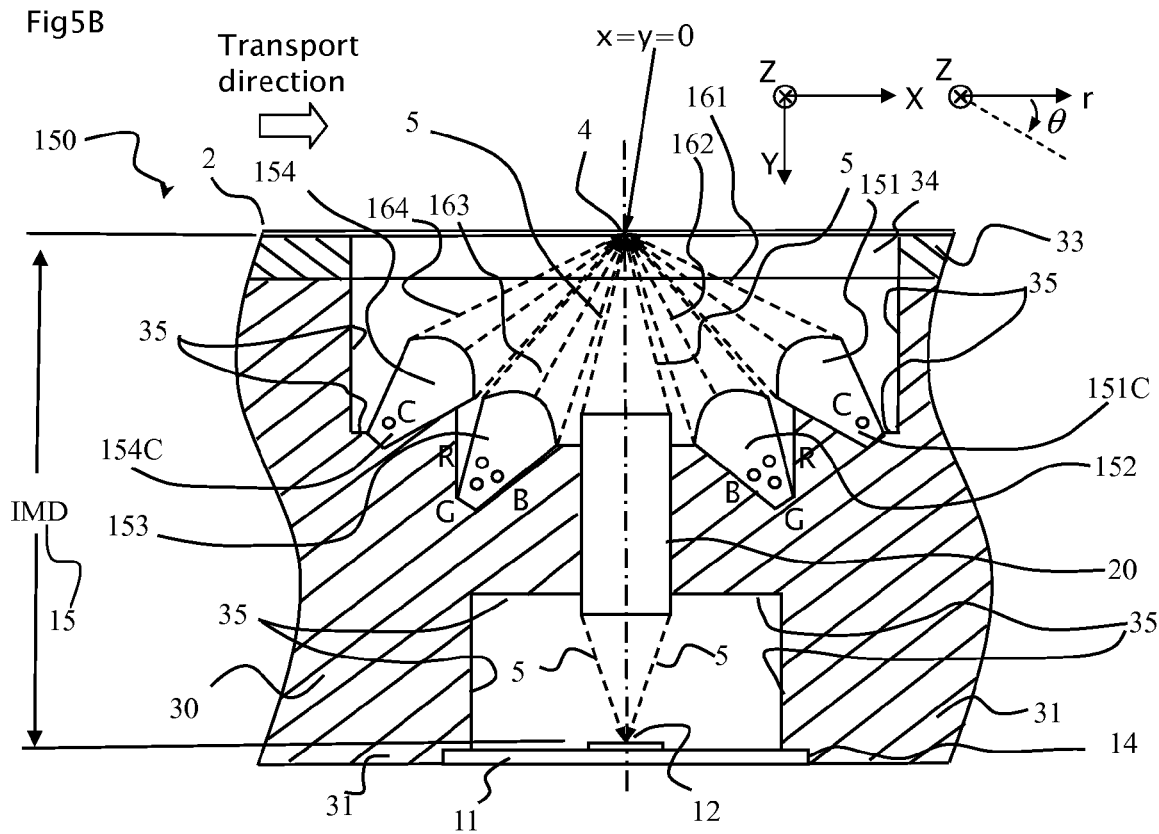

MULTIPLE LIGHTGUIDE ELECTRONIC DOCUMENT IMAGING DEVICE

BACKGROUND OF THE INVENTION

1. Field of the Invention

The present invention relates to electronic document imaging. More particularly, the present invention is directed to a linear electronic document imaging device as used in an image reading apparatus such as copying apparatus, facsimile apparatus, scanner and electronic blackboard.

2. Related Background Art

To facilitate explaining the background leading to the present invention, a typical traditional lightguide electronic document imager 10 is illustrated here in FIG. 1A and FIG. 2A. The traditional lightguide electronic document imager 10 has an imager frame 30 whose top part has a scan line backing portion 33 with a transparent window 34 located therein. The top surface of the scan line backing portion 33 and the transparent window 34 are both flat for supporting an advancing document 2 with its image side down and along a transport direction as indicated by an arrow. The mechanism for advancing the document 2 is well known in the art, including for example stepper motor and drive rollers, and not shown here. To facilitate description, a background X-Y-Z Cartesian coordinates and an r-θ polar coordinates are added with the r-axis coincides with the X-axis and the θ-coordinate incrementing clockwise. Thus, as the document 2 is advanced atop the transparent window 34, the image side of the document 2 gets scanned by the traditional lightguide electronic document imager 10 line-by-line with a scan line 4 lies parallel to the Z-axis and centered at X=Y=0. Below the scan line backing portion 33 and located inside the imager frame 30 are a lightguide 13, a rod lens 20 and a line image sensor module 11. Atop the line image sensor module 11 is a line image sensing area 12 and associated built-in signal conversion circuitry (not shown) for converting an incident line image light into a corresponding video signal output 14. The lightguide 13 typically includes internal light sources such as red light source 151R, blue light source 151B and green light source 151G. The lightguide 13 converts emissions from the internal light sources into line-illumination 17 generally aiming at the scan line 4. The line-illumination 17 then gets image-wise reflected by the image side of the document 2 along the scan line 4 and focused by the rod lens 20 into incident line image 5 ultimately focusing onto the line image sensing area 12 thus consequently converted into the video signal output 14. For convenience of technical description to be presently described, an imaging parameter called imaging distance 15 (IMD) is shown that is defined as the distance between the scan line 4 and the focal point of the line image sensing area 12. A highly important and well known performance parameter for an electronic document imager is its output signal-to-noise ratio (S/N) as measured from the video signal output 14. Accordingly, it is a primary object of the present invention to provide an improved lightguide electronic document imager with a higher S/N.

SUMMARY OF THE INVENTION

A multi-lightguide document imaging device is proposed for line-by-line scanning of a document transported atop it. This device includes:

a line image sensor module having a top line image sensing area and built-in electronic circuitry for converting an incident line image into video signal output.

an intervening rod lens for focusing line image lights reflected from a scan line of the document onto the line image sensing area through an imaging distance.

a number of lightguides lightguide-1, lightguide-2, ..., lightguide-j, ..., lightguide-N (N>=2) disposed below the document where each lightguide-j has one or more built-in light sources, a longitudinal body parallel to the scan line with a transverse cross section spaced at a distance $SPC_j$ from the scan line and oriented angularly along a θ-coordinate so as to project a corresponding line-illumination aiming predominantly in an illuminating direction $ILD_j$ and closely at the scan line.

an imager frame having an integrated base portion, a multi-element support portion and a scan line backing portion. Structurally, the base portion holds the line image sensor module, the multi-element support portion holds the rod lens plus the number of lightguides and shields various imaging lights, and the scan line backing portion backs the document being transported while allowing its line-illumination through a transparent window by the numerous lightguides.

As a refinement, the imaging distance and each of the distance $SPC_j$ are adjusted to minimize, for each lightguide-j, a corresponding imaging conjugate distance $ICD_j$ defined as the total distance a light travels between the lightguide-j and the line image sensing area, so as to maximize the corresponding portion, as contributed by the lightguide-j, of light power of the incident line image.

As another refinement, the θ-coordinate of each lightguide-j is adjusted so as to maximize the corresponding portion, as contributed by the lightguide-j, of light power of the incident line image.

As another refinement, all surfaces of the imager frame potentially exposable to stray lights along all the imaging conjugate distances $ICD_j$ (j=1, ..., N) are made highly non light reflective to reduce the S/N.

As a more specific embodiment for the case of a dual-lightguide document imaging device where N=2, the transverse cross sections of the two lightguides are oriented angularly along the θ-coordinate respectively at θ=45+/−25° and θ=135+/−25° and each of the two lightguides is provided with three built-in light sources of red, green and blue. This makes the dual-lightguide document imaging device a full color imaging device having a per-color document illumination intensity that is about double that of an otherwise traditional, single lightguide imaging device.

These aspects of the present invention and their numerous embodiments are further made apparent, in the remainder of the present description, to those of ordinary skill in the art.

BRIEF DESCRIPTION OF THE DRAWINGS

In order to more fully describe numerous embodiments of the present invention, reference is made to the accompanying drawings. However, these drawings are not to be considered limitations in the scope of the invention, but are merely illustrative:

FIG. 1A and FIG. 2A depict a typical traditional electronic document imager in cross sectional and combination cross sectional/perspective views and were already described before;

FIG. 1B and FIG. 2B depict a dual-lightguide electronic document imager in cross sectional and combination cross sectional/perspective views according to an embodiment of the present invention;

FIG. 5A depicts a triple-lightguide electronic document imager in cross sectional view according to another embodiment of the present invention; and FIG. 5B depicts a quadruple-lightguide electronic document imager in cross sectional view according to yet another embodiment of the present invention.

DETAILED DESCRIPTION OF THE PREFERRED EMBODIMENTS

The description above and below plus the drawings contained herein merely focus on one or more currently preferred embodiments of the present invention and also describe some exemplary optional features and/or alternative embodiments. The description and drawings are presented for the purpose of illustration and, as such, are not limitations of the present invention. Thus, those of ordinary skill in the art would readily recognize variations, modifications, and alternatives. Such variations, modifications and alternatives should be understood to be also within the scope of the present invention.

Figure 1A:
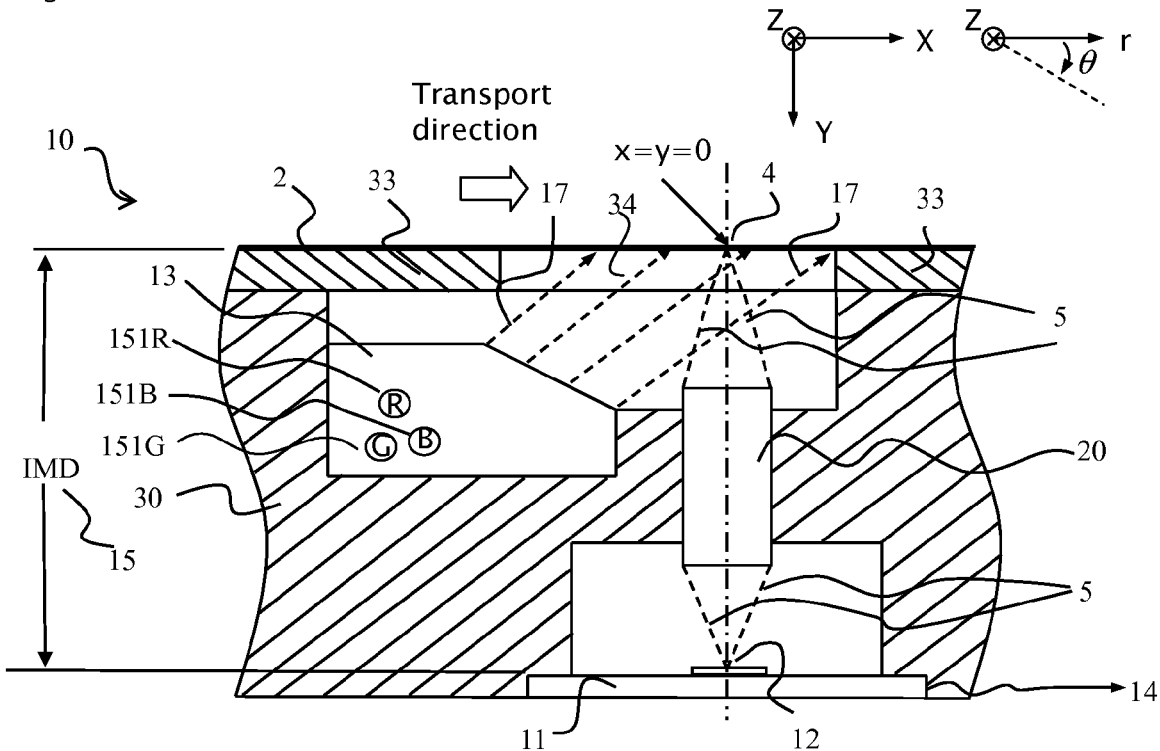
Figure 1A:
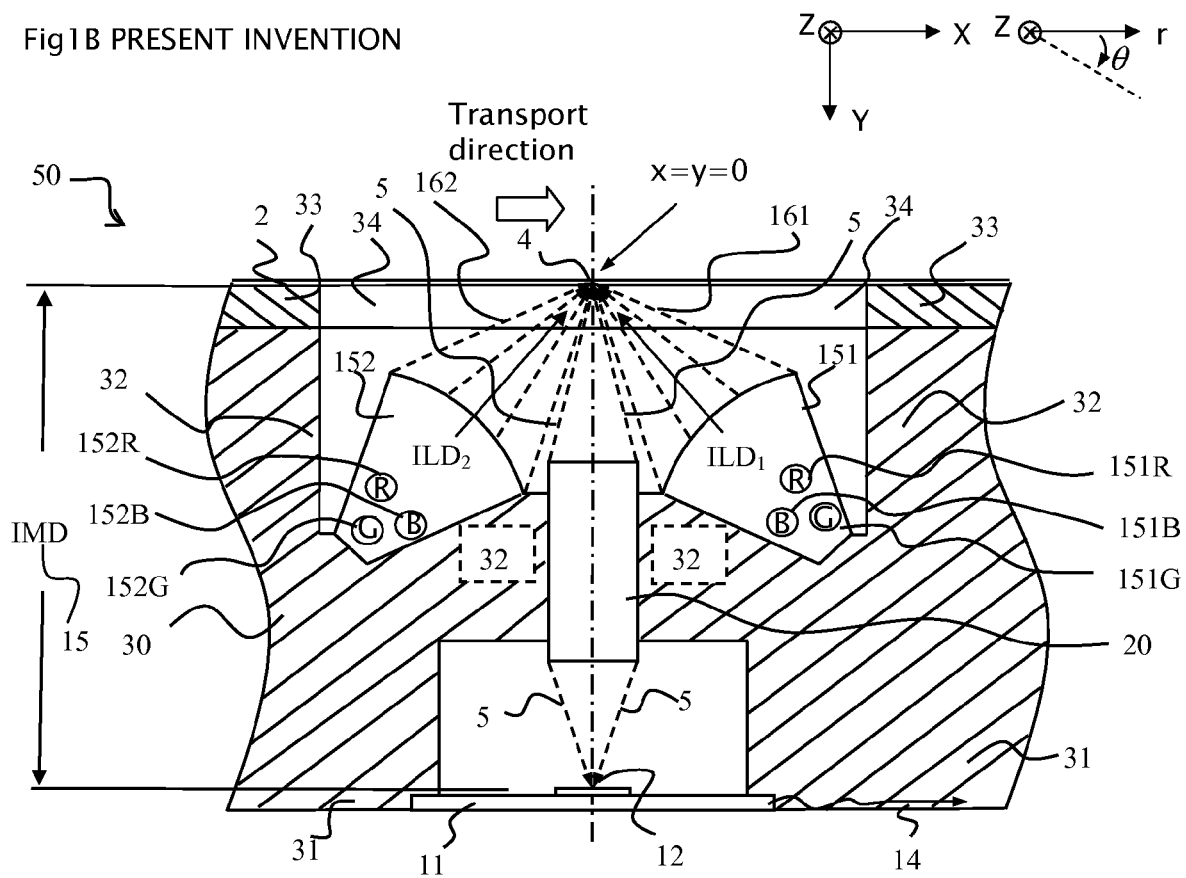

FIG. 1B and FIG. 2B depict a dual lightguide electronic document imager 50 in cross sectional and combination cross sectional/perspective views according to an embodiment of the present invention. Comparing with the traditional lightguide electronic document imager 10 depicted in FIG. 1A and FIG. 2A, the structural portion of the dual lightguide electronic document imager 50 dealing with document transport and imaging light path from the scan line 4 down to the rod lens 20 and the line image sensing area 12 is the same as the traditional case. However, instead of a single lightguide, two lightguides, lightguide-1 151 and lightguide-2 152, are now disposed below the scan line 4. The lightguide-1 151 has three built-in light sources red light source 151R, blue light source 151B and green light source 151G. The lightguide-2 152 also has three built-in light sources red light source 152R, blue light source 152B and green light source 152G. The longitudinal body of both lightguides 151 and 152 lie parallel to the Z-axis while their transverse cross sections are oriented angularly along the θ-coordinate so as to respectively project a first corresponding line-illumination-1 161 and a second corresponding line-illumination-2 162 aiming predominantly in a first illuminating direction $ILD_1$ and a second illuminating direction $ILD_2$ closely at the scan line 4 with essentially no spatial interference between the bodies of lightguides 151 and 152 and the numerous focusing lights, labeled as incident line image 5, between the scan line 4 and the line image sensing area 12. For structural support, the imager frame 30 is now provided with an integrated base portion 31, a multi-element support portion 32 and a scan line backing portion 33. Like before, the base portion 31 holds the line image sensor module 11. However, the scan line backing portion 33 backs the document 2 being transported while allowing its line-illumination by the lightguides 151 and 152 and the multi-element support portion 32 holds the rod lens 20 plus the lightguides 151 and 152 and shields the numerous lights of the incident line image 5. As the total light power from the lights of the incident line image 5 is now contributed by two lightguides 151 and 152 instead of only one lightguide 13 before, a corresponding increase of S/N of the dual lightguide electronic document imager 50 can be expected. As an example, for the case where light power from each of the lightguides 151 and 152 is the same as that from the lightguide 13 the S/N is doubled. As a second example, for the case where light power from each of the lightguides 151 and 152 is only 70% of that from the lightguide 13 the S/N is still increased by 40%. In another embodiment, while not shown here to avoid obscuring details, the video signal output 14 can be made digital by incorporating an Analog-to-Digital Converter (ADC) in the built-in electronic circuitry of the line image sensor module 11. Furthermore, while the illustrated composition of the built-in light sources of lightguides 151 and 152 are the same, red, green and blue for full color imaging, the composition does not have to be the same under other embodiments and this will be presently described.

Figure 3A:
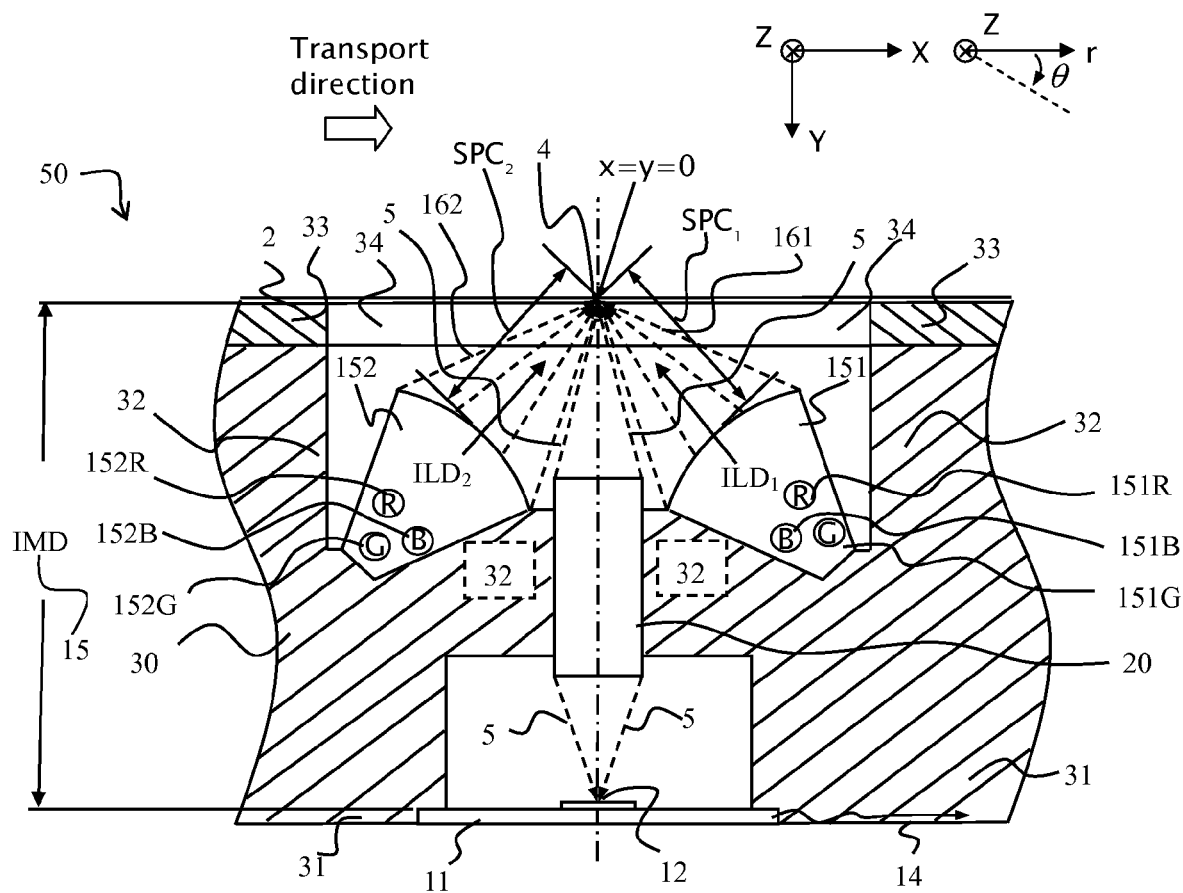
FIG. 3A and FIG. 3B illustrate, for the dual-lightguide electronic document imager, some key linear dimensional parameters affecting the light power of the incident line image at the line image sensing area.
Figure 3B:
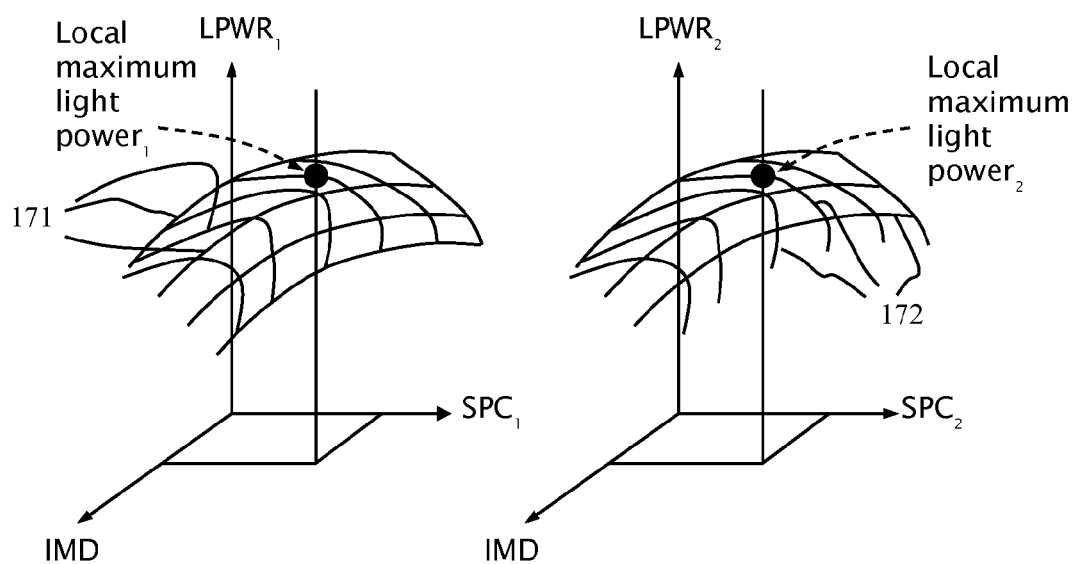

FIG. 3A and FIG. 3B illustrate, for the dual lightguide electronic document imager 50, some key linear dimensional parameters affecting the light power of the incident line image 5 at the line image sensing area 12. For simplicity of description, define $LPWR_1$ to be the light power of the incident line image 5 at the line image sensing area 12 as contributed by lightguide-1 151. Similarly, define $LPWR_2$ to be the light power of the incident line image 5 at the line image sensing area 12 as contributed by lightguide-2 152. As described before, the first key linear dimensional parameter of imaging distance 15 (IMD) is the distance between the scan line 4 and the focal point of the line image sensing area 12. A second key linear dimensional parameter is the distance $SPC_1$ between the apex of the transverse cross section (X-Y plane) of the lightguide-1 151 and the scan line 4. Likewise, a third key linear dimensional parameter is the distance $SPC_2$ between the apex of the transverse cross section (X-Y plane) of the lightguide-2 152 and the scan line 4. As a result, a first derived key linear dimensional parameter called imaging conjugate distance $ICD_1$ is defined as:

$$ICD_1 = IMD + SPC_1$$

and the $LPWR_1$ is a nonlinear, highly decreasing function of $ICD_1$. It can be seen that the $ICD_1$ is the total distance a light travels between the lightguide-1 151 and the focal point of the line image sensing area 12. Similarly, a second derived key linear dimensional parameter called imaging conjugate distance $ICD_2$ is defined as:

$$ICD_2 = IMD + SPC_2$$

and the $LPWR_2$ is a nonlinear, highly decreasing function of $ICD_2$. The $ICD_2$ is the total distance a light travels between the lightguide-2 152 and the focal point of the line image sensing area 12. As each of the various components lightguide-1 151, lightguide-2 152 and rod lens 20 needs to be of certain minimum physical size to insure their individual functionality and the physical separation amongst them must also be large enough to insure that there is essentially no spatial interference between the bodies of lightguides 151 and 152 and the numerous focusing lights of the incident line image 5, the allowable range of both IMD and $SPC_1$ are constrained. This results in a correspondingly constrained functional value 171 of $LPWR_1$ as depicted in FIG. 3B with a local maximum light power$_1$. Hence, under this embodiment both IMD and distance $SPC_1$ are selected to minimize a corresponding imaging conjugate distance $ICD_1$ so as to produce the desired local maximum light power$_1$. Likewise, as also depicted in FIG. 3B, both IMD and distance $SPC_2$ are selected with reference to another constrained functional value 172 to minimize a corresponding imaging conjugate distance $ICD_2$ so as to produce a desired local maximum light power$_2$.

Figure 4A:
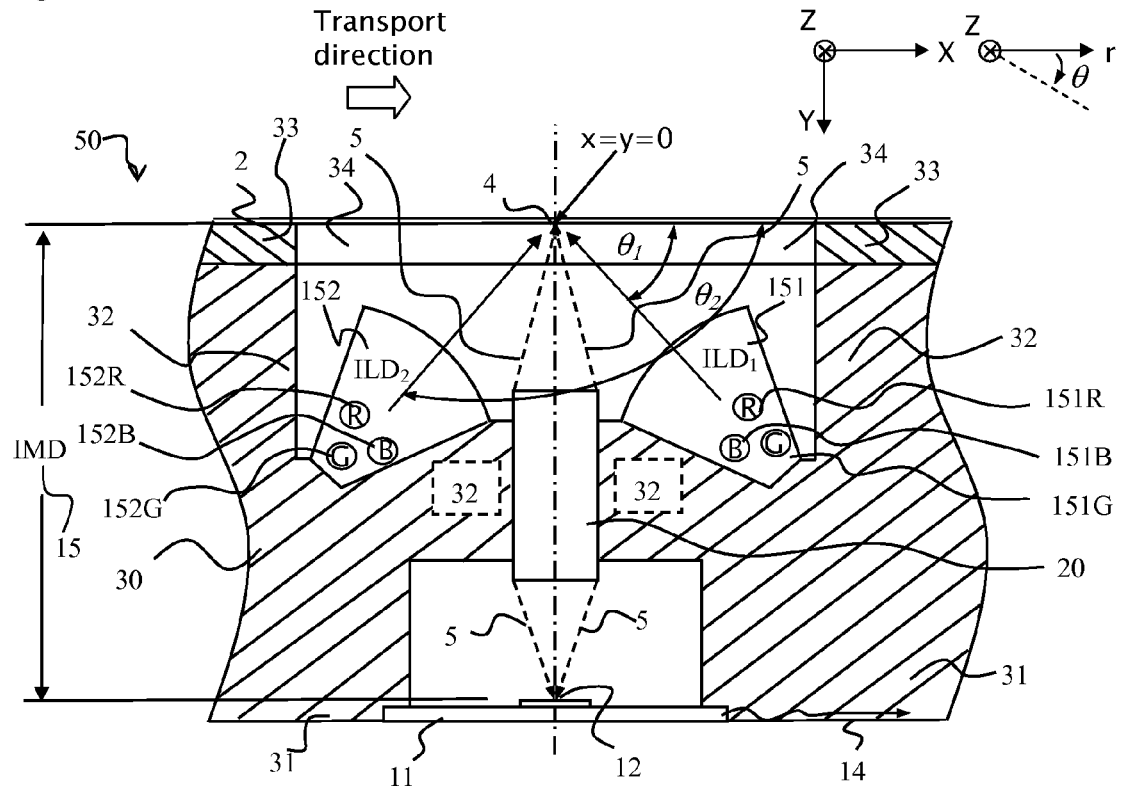
FIG. 4A and FIG. 4B illustrate, for the dual-lightguide electronic document imager, some key angular dimensional parameters affecting the light power of the incident line image at the line image sensing area.
Figure 4B:
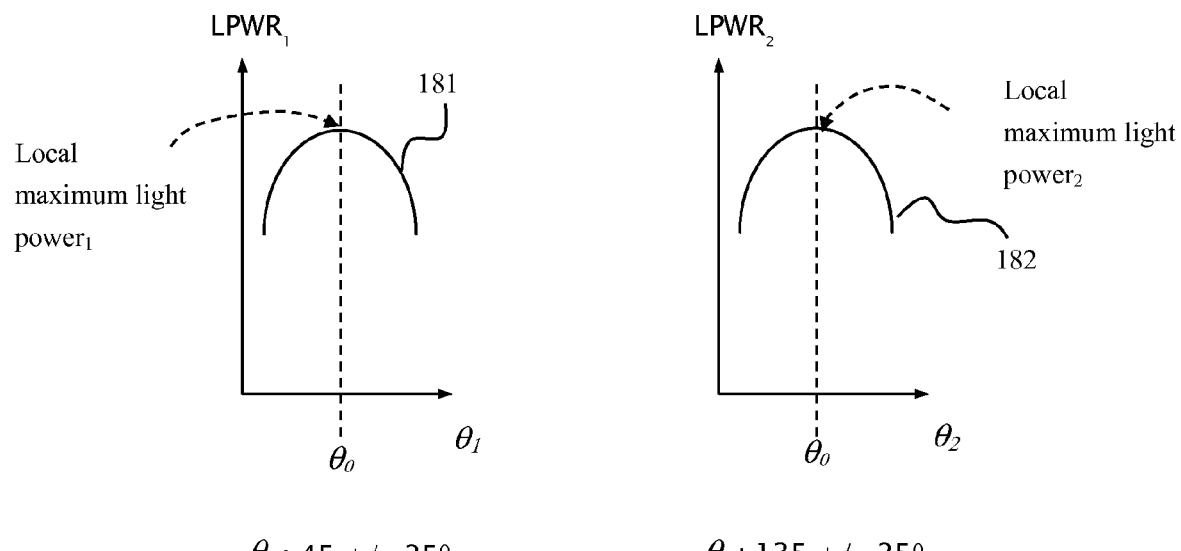

FIG. 4A and FIG. 4B illustrate, for the dual lightguide electronic document imager 50, some key angular dimensional parameters affecting the light power of the incident line image 5 at the line image sensing area 12. In this case, the first key angular dimensional parameter $\theta_1$ is the angular orientation, with reference to the first illuminating direction $ILD_1$, along the $\theta$-coordinate of the lightguide-1 151. The second key angular dimensional parameter $\theta_2$ is the angular orientation, with reference to the second illuminating direction $ILD_1$, along the $\theta$-coordinate of the lightguide-2 152. Due to an unavoidable angular, along the $\theta$-coordinate, output light power distribution from the lightguide-1 151, the $LPWR_1$ is also a constrained functional value 181 of $\theta_1$ within its constrained range and this is illustrated in FIG. 4B. Hence, under this embodiment the first key angular dimensional parameter $\theta_1$ is selected to be $\theta_0$ so as to produce a desired local maximum light power$_1$. Due to an unavoidable angular, along the $\theta$-coordinate, output light power distribution from the lightguide-2 152, the $LPWR_2$ is also a constrained functional value 182 of $\theta_2$ within its constrained range and this is also illustrated in FIG. 4B. Hence, under this embodiment the second key angular dimensional parameter $\theta_2$ is selected to be $\theta_0$ so as to produce a desired local maximum light power$_2$. A specific embodiment under this practice is $\theta_1=45+/-25°$ and $\theta_2=135+/-25°$.

To those skilled in the art, by now it should become clear that, within the physical limit imposed by the minimum practical sizes of the lightguides and rod lens, the present invention is not limited to the case of two lightguides. Thus, FIG. 5A illustrates a triple lightguide electronic document imager 100 in cross sectional view according to another embodiment of the present invention. A first lightguide-1 151 produces a line-illumination-1 161. A second lightguide-2 152 produces a line-illumination-2 162. A third lightguide-3 153 produces a line-illumination-3 163. Furthermore, the composition of built-in light sources amongst the lightguides are not the same. Specifically, the lightguide-2 152 is provided with two white light sources 152W. The variation of light source composition, in combination with a corresponding consistent adjustment of the built-in electronic circuitry of the line image sensor module 11 then allows numerous other applications such as custom color image scanning.

FIG. 5B depicts a quadruple lightguide electronic document imager 150 in cross sectional view according to yet another embodiment of the present invention. A first lightguide-1 151 produces a line-illumination-1 161. A second lightguide-2 152 produces a line-illumination-2 162. A third lightguide-3 153 produces a line-illumination-3 163. A fourth lightguide-4 154 produces a line-illumination-4 164. In addition to having the four lightguides 151, 152, 153 and 154, each of the two lightguides 151, 154 has a built-in custom light source C, for example "orange" in color. Furthermore, all imager frame interior surfaces 35 of the imager frame 30 potentially exposable to stray lights along the imaging conjugate distances $ICD_1$, $ICD_2$, $ICD_3$ and $ICD_4$, are made highly none light reflective to reduce the S/N of the quadruple lightguide electronic document imager 150. The imager frame interior surfaces 35 can be treated with, for example, surface coating using a matt black paint.

Throughout the description and drawings, numerous exemplary embodiments were given with reference to specific configurations. It will be appreciated by those of ordinary skill in the art that the present invention can be embodied in numerous other specific forms and those of ordinary skill in the art would be able to practice such other embodiments without undue experimentation. The scope of the present invention, for the purpose of the present patent document, is hence not limited merely to the specific exemplary embodiments of the foregoing description, but rather is indicated by the following claims. Any and all modifications that come within the meaning and range of equivalents within the claims are intended to be considered as being embraced within the spirit and scope of the present invention.

What is claimed is:

1. A multiple lightguide electronic document imaging device for, expressed both within X-Y-Z Cartesian coordinates and within r-$\theta$-Z polar coordinates with the r-axis coinciding with the X-axis and the $\theta$-coordinate incrementing clockwise, line-by-line scanning, with the scan line parallel to the Z-axis and centered at X=Y=0, of a document transported along the X-axis with respect to the multiple lightguide electronic document imaging device, the imaging device comprising:

(a) a line image sensor module, having a top line image sensing area and built-in electronic circuitry coupled thereto for converting an incident line image into a corresponding video signal output, the line image sensor module being disposed below and facing the scan line such that an incident line image emanated generally in the Y-direction therefrom, after traveling through an imaging distance (IMD), coincides with the line image sensing area;

(b) an intervening rod lens, having its longitudinal axis parallel to the Z-axis and located along the imaging distance, for focusing the emanated Y-direction line image lights onto the line image sensing area;

(c) a plurality of lightguides lightguide-1, lightguide-2, . . . , lightguide-j, . . . , lightguide-N (N>=2) disposed below the scan line wherein each lightguide-j has one or more built-in light sources, a longitudinal body parallel to the Z-axis with a transverse cross section spaced at a distance $SPC_j$ from the scan line and oriented angularly along the $\theta$-coordinate so as to project a corresponding line-illumination aiming predominantly in an illuminating direction $ILD_j$ and closely at the scan line with essentially no spatial interference between the plurality of lightguides and the incident line image lights between the scan line and the line image sensing area; and (d) an imager frame having an integrated base portion, a multi-element support portion and a scan line backing portion, said base portion for holding the line image sensor module, said multi-element support portion for holding the rod lens plus the plurality of lightguides and for shielding the focusing lights, and said scan line backing portion for backing the document being transported while allowing its line-illumination by said plurality of lightguides.

2. The multiple lightguide imaging device of claim 1 wherein said imaging distance and each of said distance $SPC_j$ are adjusted to minimize, for each lightguide-j, a corresponding imaging conjugate distance $ICD_j$ defined as the total distance a light travels between the lightguide-j and the line image sensing area, whereby maximizes the corresponding portion, as contributed by the lightguide-j, of light power of the incident line image.

3. The multiple lightguide imaging device of claim 1 wherein the angular orientation along the $\theta$-coordinate of each lightguide-j is adjusted whereby maximizes the corresponding portion, as contributed by the lightguide-j, of light power of the incident line image.

4. The multiple lightguide imaging device of claim 1 wherein an area of the scan line backing portion surrounding the scan line further comprises a transparent window for mechanically shielding, from the document being transported, all components of the multiple lightguide imaging device below the scan line backing portion while allowing light through thus enabling the scanning of the document.

5. The multiple lightguide imaging device of claim 1 wherein all surfaces of the imager frame potentially exposable to stray lights along all the imaging conjugate distances $ICD_j$ (j=1, ..., N) are made highly non light reflective whereby reduces the signal-to-noise ratio (S/N) of the multiple lightguide imaging device.

6. The multiple lightguide imaging device of claim 1 wherein the built-in electronic circuitry further comprises at least one Analog-to-Digital Converter (ADC) whereby make the video signal output digital.

7. The multiple lightguide imaging device of claim 1 wherein N=2.

8. The multiple lightguide imaging device of claim 7 wherein the transverse cross sections of the two lightguides are oriented angularly along the θ-coordinate respectively at θ=45+/−25° and θ=135+/−25°.

9. The multiple lightguide imaging device of claim 7 wherein each of the two lightguides has three built-in light sources.

10. The multiple lightguide imaging device of claim 9 wherein the three built-in light sources are red, green and blue whereby make the multiple lightguide document imaging device a full color imaging device having a per-color document illumination intensity that is about double that of an otherwise single lightguide imaging device.

* * * * *